Sept. 8, 1959      W. T. CHATER      2,902,765
BRIDGE CIRCUIT FOR POSITION MEASURING DEVICE
Filed July 2, 1956
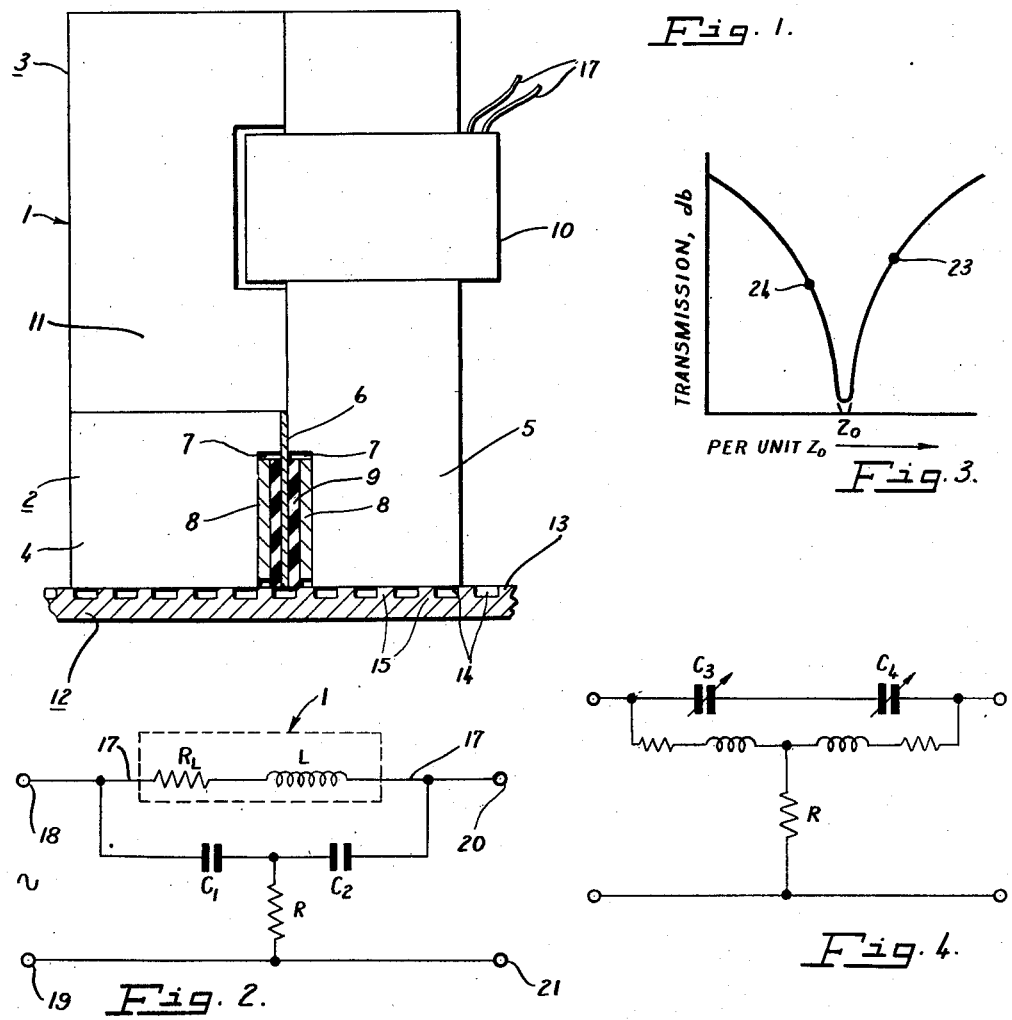
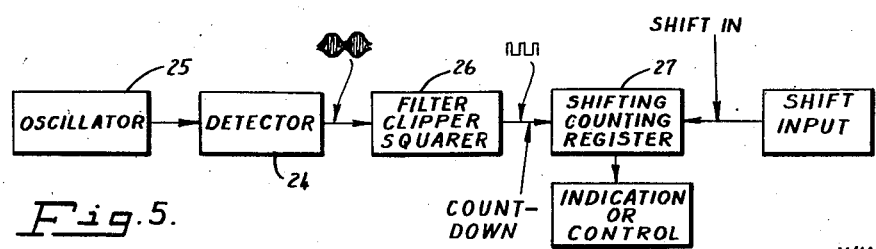
INVENTOR,
WILLIAM T. CHATER
BY
ATTORNEY

United States Patent Office 2,902,765
Patented Sept. 8, 1959

2,902,765

BRIDGE CIRCUIT FOR POSITION MEASURING DEVICE

William T. Chater, El Segundo, Calif., assignor to Hughes Aircraft Company, Culver City, Calif., a corporation of Delaware Application July 2, 1956, Serial No. 595,256

3 Claims. (Cl. 33—125)

This invention relates generally to incremental displacement detecting systems and to arrangements embodying such systems for determining the magnitude of a displacement, or for determining a position, in dependence of said incremental displacements.

Certain detail aspects of a specific embodiment of this invention are related to a copending application of David F. Brower, Serial No. 588,711, filed June 1, 1956, entitled "Variable Reluctance Electro-Magnetic Device," and assigned to the assignee of this invention.

For the purposes of illustration and without any intention of limiting the invention as to application, this invention is disclosed in connection with a specific arrangement for detecting incremental displacements. Organizations of this general nature are ideally suited for the precision positioning of various devices, such as, control members in servo systems, parts on an automatically controlled conveyor arrangement on which machine or assembly operations are to be performed, etc.

In the latter application, positional accuracy in the order of one mil or less is a requirement. Proportional devices capable of detecting minute displacements of this order are usually very delicate both electrically and mechanically and are frequently not sufficiently reliable in the environments encountered in the average industrial application, to represent a satisfactory solution to the problem. Moreover, proportional devices require either very substantial amplification of their outputs, if used to control an analog type of servo, or require the additional consideration of relatively complex analog-to-digital conversion, if used in conjunction with digital computers to achieve the advantages of the latter.

It is believed advantageous therefore to provide an arrangement of the character generally referred to wherein provision is made for detecting discrete substantially equal increments of displacement over a predetermined total displacement range through the provision of an accurately calibrated scale and a suitable electrical transducer arrangement, for example, of the form of a variable impedance, for producing an electrical quantity which varies between two predetermined values with successive increments of displacement with respect to said scale. One such device is disclosed in the copending application of David F. Brower aforesaid.

Arrangements of this general nature are unique and distinct with respect to proportional types of devices in that they produce essentially discrete electrical quantities, adapted through simple circuit expedients, as input information in digital computer arrangements whereby, with suitable counting and/or comparison techniques, position determinations may be made.

Accordingly, one object of this invention is to provide a highly sensitive variable impedance system controllable in dependence of predetermined physical conditions.

Another object of this invention is to provide an incremental displacement detecting system which is simple with respect to operational requirements and positive in operation.

A further object of this invention is to provide an incremental displacement detecting system including a variable impedance type of displacement detector in which the system transmission is effectively controlled between two electrical transmission states.

A more specific object of this invention is to provide an incremental displacement detecting system embodying a variable impedance incremental displacement detector, wherein said system is critically responsive to impedance variations of said detector.

It is also an object of this invention to provide a digital type of position detecting system.

For a better understanding of this invention together with other and further objects thereof, reference is made to the following description taken in conjunction with the accompanying drawing, given by way of example, wherein:

Fig. 1 is an elevational view fragmentarily in section of one type of variable impedance incremental displacement detector employable with this invention;

Fig. 2 diagrammatically illustrates an incremental displacement detecting system embodying the principles of this invention;

Fig. 3 graphically illustrates typical transmission characteristics of the arrangement of Fig. 2;

Fig. 4 illustrates a modification of the circuit arrangement of Fig. 2; and

Fig. 5 is a block diagram of a type of a position detector embodying the principles of this invention.

The incremental displacement detector illustrated in Fig. 1 is described in some detail in the aforesaid copending application of David F. Brower and only such description thereof appears in this disclosure as is necessary for an understanding of the present invention.

The need in digital computers for discrete bits of information, individually representative of discrete conditions, imposes problems in position detecting which are considerably different from those involved with analog type of computer arrangements. In the present invention, efforts are made to provide a system capable of producing discrete electrical signals or quantities corresponding to scale increments related to certain physical magnitudes. In connection with position detection, the scale values correspond to increments of displacement of a physically displaceable member.

To this end a variable impedance arrangement, such as illustrated in Fig. 1, may be provided for producing impedance variations between two impedance states for successive increments of physical displacement. The arrangement illustrated in Fig. 1 embodies an electromagnetic detector head, generally designated 1, comprising respective substantially independent magnetic circuits 2 and 3. Magnetic circuit 2 is a three-pole arrangement comprising respective outer pole legs 4 and 5 and a smaller central pole leg 6. A suitable cavity 7 is provided on each side of the central pole leg in the assembly, as shown, to receive a single turn coil 8 of a thin electrical conducting foil, such as silver foil, which is wrapped about the center pole 6, over a suitable thin sheet of electrical insulating material 9. As will be seen by reference to Fig. 1, the outer pole legs 4 and 5 are relatively large as compared with the center pole leg 6.

The single turn coil 8, herein referred to as the detector coil, is transformer coupled (the inductive coupling arrangement not being shown) to a coil 10. Coil 10 is disposed on an extension of the core leg 5 and the magnetic circuit for the coil assembly is completed by the U-shaped magnetic core section 11, the legs of which bracket the winding 10 and seat against the side of the extension of the pole 5.

The bottom faces of the respective legs 4, 5 and 6 of the three-legged magnetic circuit 2, terminate in a common plane. This may be accomplished by grinding or by some other suitable machine operation. These pole faces slidably operate along a scale 12 of magnetic material having a grooved face 13 confronting the ends of the pole face of the three-legged core. Grooves 14 in the scale face 13 are substantially equally spaced, defining lands 15 therebetween.

It will be noted by reference to Fig. 1 that the pole faces of the legs 4 and 5 are sufficiently wide to straddle a plurality of the grooves 14 and that the center leg 6 defines a pole face having a width which is less than the width of the respective grooves 14. This center leg therefore functions effectively as a magnetic probe presenting substantial air gap variations in the magnetic circuit upon relative movement of the scale with respect to the three-legged magnetic circuit, to provide marked reluctance changes in the magnetic circuit depending upon whether the center pole is over a groove or a land on the scale 13. These reluctance variations through the coupling in the magnetic circuit and through the transformer coupling between the coil 8 and the coil 10, result in marked inductance or impedance changes in the coil 10 upon relative movement between the scale 12 and the detector head assembly. The characteristic of the impedance change, through proper proportioning of the center pole 6 with respect to the grooves and lands, results in an impedance variation between two predetermined values wihch is substantially reproducible among the incremental steps of displacement. Thus, with this arrangement, a positive indication is obtained of the position of the relatively movable parts of the complete incremental displacement detector with respect to the grooves and the lands.

It is to be understood that this arrangement represents but one of numerous arrangements which may be utilized for the purpose indicated, all of which may be classified within the general category of variable impedance devices. In fact, it is conceivable that a suitable type of switching device mechanically actuated by grooves of the general nature indicated in the scale 12, may be utilized to periodically shunt a suitable electrical impedance to achieve substantially the same purpose herein indicated. Modified devices and their application in systems for the purposes indicated will of course depend to a large extent upon the degree of accuracy required in detecting displacement. Where accuracies of the order of a mil or less are required, many mechanically actuated arrangements may prove impractical. However, these problems involve matters of degree only.

Conventional arrangements for detecting the impedance variations of devices of the type referred to usually comprise Wheatstone bridge circuits. The conventional four-legged bridge circuit offers a convenient solution to the problem of utilizing the impedance variation in analog type systems. However, such circuit arrangements have the distinct disadvantage of requiring a balanced input circuit and, because of their electrical configuration, are usually not readily adapted for use in connection with electronic circuits because of their lack of a common terminal between the input and output circuits. Moreover, since proportionality between circuit unbalance and the impedance change which produces the circuit unbalance is ordinarily required, such circuits are usually of a linear nature.

With an arrangement of the type described, the electrical variation of the circuit insofar as its transmission characteristics are concerned, need not be a linear function of the impedance change. The requirement here being simply that of having a circuit which is highly impedance sensitive and which is effectively switchable between two respective transmission states as some function of the impedance change. Since the digital circuitry responsive to the change in transmission state of the circuit is usually not critically sensitive to minor excursions in signal values in their two extremes, the nature of the problem is thus considerably different from that of the proportional type of arrangement, depending primarily for its accuracy upon the accuracy of the grooved, or otherwise suitably marked, scale. This is basically a mechanical problem and not an electrical problem. Thus the arrangement is far less sensitive to environmental conditions, such as, temperature and vibration, which are normally a matter of serious concern in some proportional detector arrangements.

Thus, it is possible to utilize an impedance circuit which is critically sensitive to impedance variations in one of its impedance branches and which involves electrical considerations which are compatible with the electronic circuits associated therewith. A circuit which falls within the requirements generally outlined hereinabove is illustrated in Fig. 2. This is a bridged-T circuit commonly used as a single-frequency rejection filter. This circuit comprises conventional impedance circuit branches, including the detector head 1 indicated in dotted outline as one of the impedance branches, wherein the resistive and inductive components of the electromagnetic head form one impedance circuit branch and are represented, respectively, in the resistive component $R_L$ and inductive component L. The shunt circuit branch impedances with respect to the detector head 1 are comprised of respective capacitors $C_1$ and $C_2$ and the circuit is completed by a resistor R connected between the junction of capacitors $C_1$ and $C_2$ and the other side of the line.

For the purposes of discussion, terminals 18 and 19 may represent the input terminals to the circuit and terminals 20 and 21 may represent the output terminals. With the arrangement illustrated the circuit is adapted for energization with alternating current which for one value of impedance of the detector head 1, results in maximum attenuation of alternating current input. Thus the electrical transmission of the circuit between its input and output terminals is at some minimum value. Variations of impedance of the incremental position detector result in sharp changes in the transmisson characteristics of the circuit.

A qualitative indication of the behavior of the circuit with impedance changes, for a predetermined frequency of alternating current input, appears in the curve of Fig. 3. In Fig. 3, the transmission state of the circuit is plotted in decibels against per unit impedance $Z_0$, $Z_0$ representing the value of impedance for which maximum attenuation of the alternating current input obtains. This condition is indicated by the lowermost point of the curve in Fig. 3. Thus, it will be apparent that an increase of impedance above the $Z_0$ value results in a sharp change in the transmission state of the circuit, as indicated, for example, by point 23 on the curve. Similarly point 24 may indicate a transmission state resulting from an impedance state which is less than the impedance state $Z_0$. From this, it will be apparent that the selected value of impedance, $Z_0$, for which maximum circuit attenuation obtains, may be either that impedance value obtained from positioning the center pole of the detector head over a land or over a groove along the scale 13, the impedance variation in each case being effective to markedly change the transmission state of the electrical network in which the detector head is connected.

It will be appreciated from a study of the arrangement indicated that the transmission state of the network varies between two values, to obtain an electrical output which is sharply indicative of the position of the detector head over a land or over a groove along the scale, providing effective detection of incremental displacements.

The use of a variable impedance in which the impedance is expressable as capacitive reactance results in a circuit configuration of the type shown in Fig. 4, wherein capacitors $C_3$ and $C_4$ are the variable elements. The behavior of this circuit being analogous to that of Fig. 2 will be readily appreciated from the foregoing discussions. Although two capacitors have been shown, it is to be understood that a single variable capacitor may be employed. If used as a variable capacitance incremental displacement detector, the capacitance change will then correspond to incremental steps of displacement in a manner analogous to the inductance change obtained in the arrangement of Fig. 1. The capacitance change, however, may be the result of other physical conditions, such as the impact of sound energy on a diaphragm, or other means for forcing a capacitance change.

Variable resistance devices also offer a way of detecting physical displacements. Such a variable resistance device may be substituted directly for the detector in the circuit of Fig. 2 and adjusted for maximum attenuation of the electrical input for a given value of resistance. In general, this circuit will not have the sharp response characteristics as those previously discussed.

In most applications the common terminal of the circuits disclosed will be grounded. However, in a circuit such as shown in Fig. 4, if the capacitors are driven by a stylus, for example, as in a phonograph pickup, it may be desirable to ground the common capacitor plates.

The electrical indications of incremental displacements produced by the various circuits may be utilized by conventional circuit means in an arrangement for detecting the position of the detector head with respect to a reference point on the scale, or may be effective for indicating the total displacement of the device with respect to some arbitrary starting point along the scale. This is indicated in an elementary way in Fig. 5 in block diagram wherein the output of the detector network 24 which may be energized by any suitable type of oscillator 25 to provide the frequency of alternating current voltage required for the particular values of impedance of the network, is applied to a conventional circuit 26 which filters, clips and squares the output signal of the detector network to produce a rectangular wave type of output voltage. This output voltage may be applied to a conventional shifting and counting register 27 to obtain an indication of the actual position of the device along the scale. For the purpose of simplifying this consideration let it be assumed that the count begins with the first groove on the scale. Thus, as successive grooves and lands move beneath the center pole of the detector head consecutive rectangular voltage pulses are produced.

By way of example, the shifting and counting register 27 may be of the type illustrated in Fig. 3 of a copending application of William L. Exner, et al., Serial No. 459,302, filed September 30, 1954, entitled, "Broad Bandwidth Digital Servo" and assigned to the assignee of this invention. This register is capable of receiving a shift-in count, which in this instance is indicative of a corresponding number of scale counts with respect to the scale 12. Thus, the shift-counting register has applied to it information concerning a desired relative position between the scale and the detector head. The square waves which result from this relative movement with respect to the beginning of the scale marks, are applied to the count-down input of the shifting-counting register, which counts down the register contents until zero count remains in the register. At this point, the desired relative position between the movable parts of the incremental displacement detector exists and suitable circuit arrangements of a conventional nature responsive to the register output, may be utilized to indicate such a position, or to provide a suitable control of arrangements associated with a machine tool automation system, for example, for performing a machine or assembly operation on a device, the position of which has been controlled by the system. These and other applications will be readily apparent to those skilled in the art.

It will be appreciated from the foregoing that this invention provides a simple and effective electrical network arrangement which is uniquely adapted for determining incremental displacements and for determining absolute positions as a result of the indications of incremental displacement. The circuit in Fig. 2 possesses the specific advantages of having a common terminal between its input and output connections, which in this case is represented in terminals 19 and 21 which are common with respect to the lower end of resistor R. Thus, the circuit is easily applied in connection with electronic circuits involving vacuum tubes and transistors. Moreover, the circuit does not require special electrically balanced power supplies for energizing purposes and may be energized with any one of numerous conventional types of oscillators capable of generating alternating current frequencies in the frequency range required.

It will be appreciated that the specific location of the detector head in the network, as illustrated in Figs. 2 and 4, is merely representative of one position of the detector head in the network branches. Moreover, the network circuit branches may be comprised of other impedance elements than those specifically illustrated and named herein and photosensitive devices, variably shunting suitable impedances in dependence of certain physical conditions, are also contemplated.

Although the invention has been described in connection with a linear position detection application, it is equally applicable to angular position detection.

What is claimed is:

1. An incremental displacement detection system comprising: a variable-impedance incremental displacement detector having relatively displaceable impedance varying members, and variable between two electrical impedance states in dependence of successive predetermined increments of relative displacement of said members; a single-frequency rejection filter circuit, energizable by alternating current, having a plurality of impedance circuit branches, including said variable impedance displacement detector as one branch thereof, and operative between respective attenuation states in dependence of said respective impedance states of said variable impedance detector; a rectangular wave forming circuit connected to be controlled by the output of said rejection filter circuit and producing a substantially rectangular wave voltage, and digital circuit means connected to said rectangular wave forming circuit to be controlled by said rectangular wave voltage.

2. A position detector system comprising: a scale having substantially equally spaced marks therealong, a variable impedance device operatively disposed with respect to said scale for relative movement with respect to said scale, along said scale, and including impedance varying means, responsive to said marks, for varying the impedance of said device between two impedance states in dependence of coincidence of said means with one of said marks or the space intermediate an adjacent pair of said marks; a single-frequency impedance sensitive network including, and responsive to, said variable impedance device; circuit connections for applying alternating current voltage of a frequency, for one of said impedance states of said device, to obtain substantially maximum network attenuation, a lower attenuation obtaining for the other of said impedance states of said device; a rectangular wave forming circuit arrangement connected to and controlled by the output of said network for producing a substantially rectangular wave voltage, and counting circuit means connected to and controlled by said rectangular wave forming circuit arrangement.

3. An incremental displacement detecting system comprising: a grooved scale of magnetic material; an electromagnetic detector head having a coil and a core therefor, said core being disposed in flux linkage with said scale and forming a variable reluctance magnetic circuit with said scale depending upon positioning of said head adjacent a groove or a land in said scale; a T-bridge impedance network including said coil in one branch and being adapted for energization with alternating current voltage of a predetermined frequency; and circuit means connected to said network to be controlled thereby.

References Cited in the file of this patent

UNITED STATES PATENTS

| 2,775,755 | Sink | Dec. 25, 1956 |
| 2,848,698 | Howey et al. | Aug. 10, 1958 |

FOREIGN PATENTS

| 549,065 | Germany | Apr. 22, 1932 |
| 427,913 | Great Britain | May 2, 1935 |